July 14, 1959     L. LAUGHLIN     2,894,554
TRACTION MEANS FOR AUTOMOTIVE VEHICLES
Filed Sept. 22, 1954     2 Sheets-Sheet 1
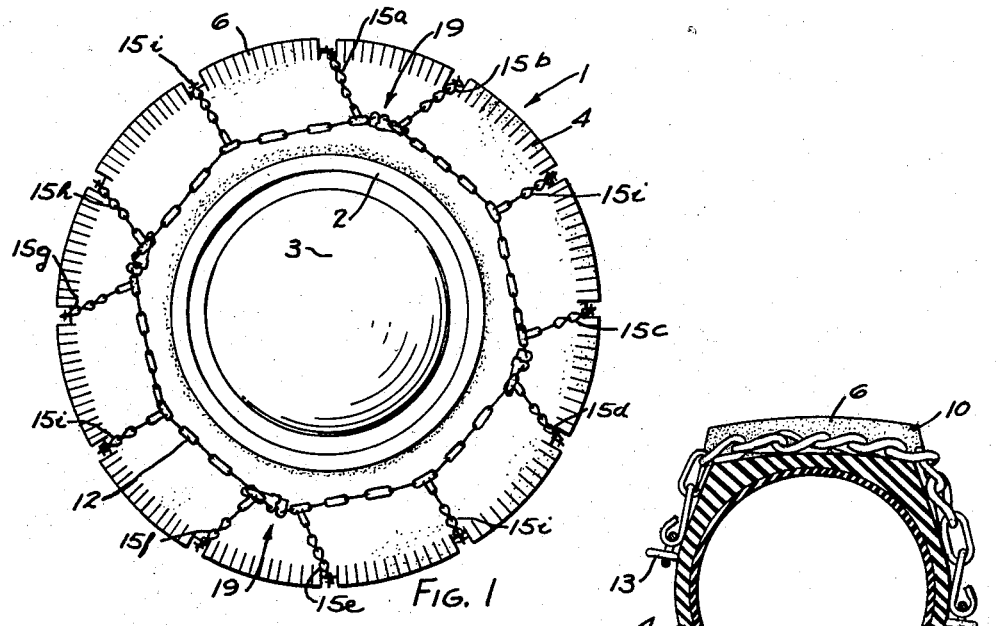
FIG. 1
FIG. 3
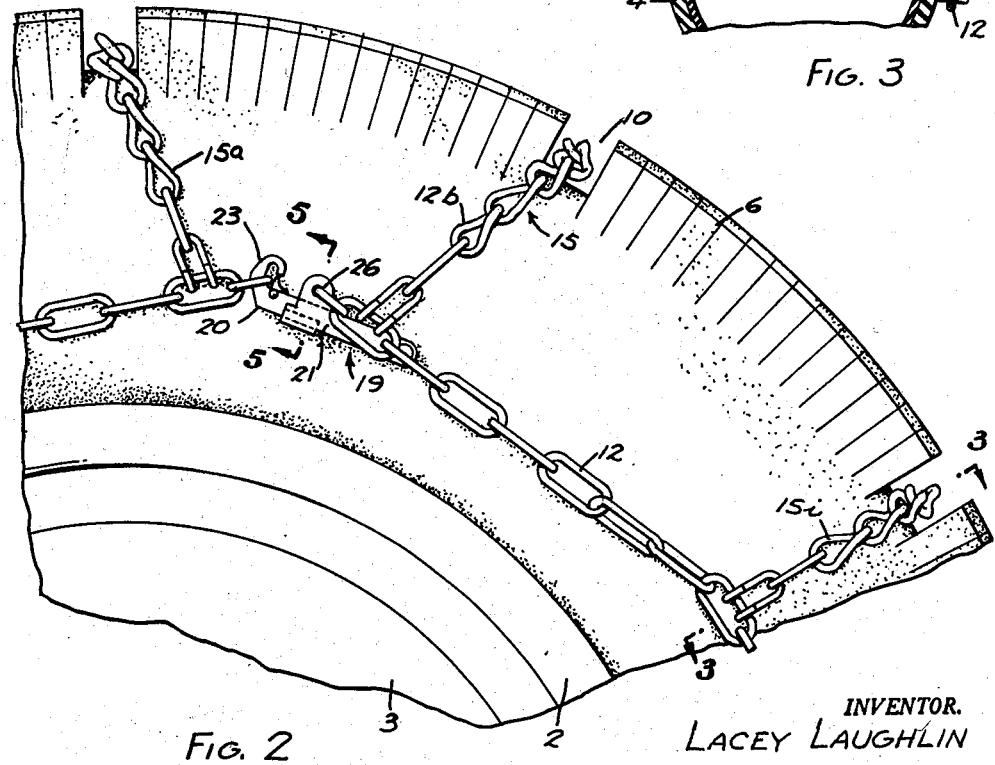
FIG. 2
INVENTOR.
LACEY LAUGHLIN July 14, 1959 L. LAUGHLIN 2,894,554
TRACTION MEANS FOR AUTOMOTIVE VEHICLES
Filed Sept. 22, 1954 2 Sheets-Sheet 2
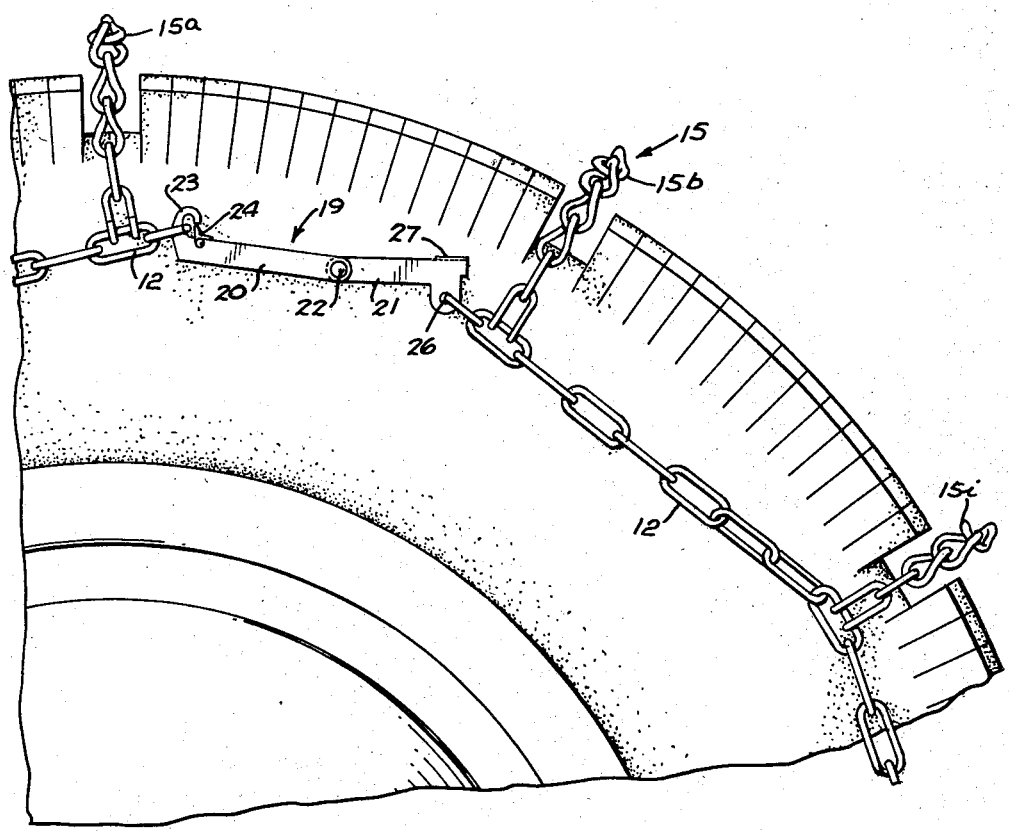
FIG. 4
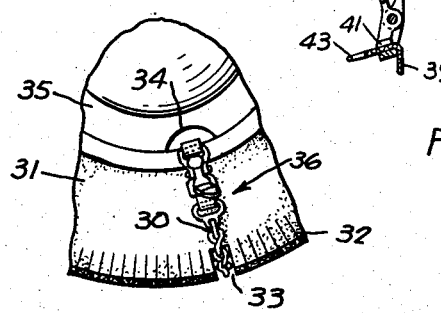
FIG. 6
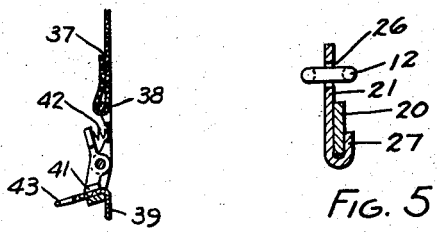
FIG. 7
FIG. 5
INVENTOR.
LACEY LAUGHLIN

United States Patent Office 2,894,554
Patented July 14, 1959

2,894,554

TRACTION MEANS FOR AUTOMOTIVE VEHICLES

Lacey Laughlin, Detroit, Mich.; Naomi Ruth Laughlin, executrix of said Lacey Laughlin, deceased Application September 22, 1954, Serial No. 457,657

1 Claim. (Cl. 152—208)

This invention relates to a tire and anti-skid chain arrangement for automotive vehicles.

The value of anti-skid chains, usually called tire chains or just chains, is well appreciated. Organizations and individuals interested in promoting safety recommend use of tire chains in snow, ice and mud. It has been stated on authority that tire chains provide several times more traction than can be obtained without them. Notwithstanding, few motorists use tire chains when they otherwise should be used; seemingly, few motorists equip themselves with tire chains. Reasons for this inconsistency appears to lie largely in the difficulty of mounting the chains upon and removing the chains from the wheels, and also the most undesirable condition which exists when a motor vehicle equipped with tire chains is operated on pavement which is cleared of snow.

For example, consider a motorists who daily drives miles on paved roads or highways, which are usually cleared of snow by governmental authorities and yet who must, from time to time, operate his vehicle over one or more secondary roads or side lanes as, for example, the last partial mile from the main highway to the motorist's home. When snow occurs, particularly a heavy snow, it may be impossible to traverse the secondary rod, yet motorists avoid use of chains. Seemingly, it is preferable to run the risk of "getting stuck" in the snow on the secondary road than it is to suffer through the miles of operation on cleared highways. It is not feasible to put on chains and remove them each time road conditions change. In fact, after a motor vehicle becomes bogged down in snow, it is practically impossible for a single motorist to mount tire chains with the equipment a motorist usually carries.

The object of this invention is to provide a tire and chain arrangement and combination thereof wherein the chains may be mounted upon a wheel, adjusted so that they are not operative from the standpoint of functioning as a tire chain, so that the vehicle may be operated on cleared roads or highways with the chains not in use although mounted on the wheel, and wherein, by a simple manipulation, the chains may be rendered operative, even after the vehicle has become bogged down or stuck in the snow. The invention is thus useful in the present day manner of living where so many motorists live long distances from their place of work, traverse main roads, streets and highways each day to and from work and yet must traverse secondary thoroughfares or lanes as well.

The invention is disclosed in the accompanying drawings:

Fig. 1 is an elevational view of an automobile wheel with a pneumatic tire thereon and with a tire chain mounted thereon and adjusted to inoperative position.

Fig. 2 is an enlarged view showing the tire and chain thereon with the chain adjusted to inoperative position.

Fig. 3 is a sectional view taken substantially on line 3—3 of Fig. 2.

Fig. 4 is a view similar to Fig. 2 illustrating the chain adjusted to operative position.

Fig. 5 is a sectional view taken on line 5—5 of Fig. 2 illustrating a latch.

Fig. 6 is a view illustrating a single chain element mounted on a wheel.

Fig. 7 is a sectional view illustrating a form of buckle usable with the form shown in Fig. 6 and showing the chain extended.

In Fig. 1 the wheel is illustrated as a whole at 1, the metal wheel per se having a rim 2, the center portion of the wheel being enclosed and covered by a hub cap 3. The pneumatic tire is shown at 4.

The tread of the penumatic tire may have, over its general tread surface, any suitable tread design as generally indicated at 6. The tire is provided with a plurality of grooves extending transversely across the tread. Each groove is indicated at 10.

The chain illustrated is of rather conventional construction in that it comprises two elements which may be called stringers; these are lengths of chain generally illustrated at 12 and 13 and when applied lie along the sides of the tire. Interconnecting these stringers are a plurality of cross chains each indicated at 15. In the form shown, there are twelve cross chains provided. In this event the tire 4 is to be formed with at least twelve cross grooves 10 so that there will be at least one such groove in the tire for each cross chain.

The stringer 13 is to be disposed on the inside face of the tire and in this regard it may have the usual single latching device for connecting its ends. Thus, when mounted on the tire, the inside stringer 13 once applied and adjusted to the tire has a fixed or determined circumferential extent.

The outside stringer is provided with a plurality of take-up devices or latches as shown in Figs. 2 and 4, each generally indicated at 19. The take-up device illustrated comprises a member 20 and a member 21 pivotally connected together as at 22. One link of the stringer 12 is connected to the member 20 as by means of a hook 23 with a retaining latch member 24 while another link of the stringer 12 is connected to the member 21. This may be a relatively permanent connection wherein a link passes through an aperture 26. The member 21 has a hook portion 27 as will be seen by reference to Fig. 5.

It is preferable to provide the stringer 12 with a plurality of such take-up devices in order that the circumferential extent and, therefore, the diameter of the stringer 12, when applied to the tire and in use, may be sufficiently varied to adjust the chain to and from operative and inoperative positions.

As shown in Fig. 1, there are four take-up devices preferably equally spaced relative to the cross chains 15. For instance, there is a take-up device 19 between the cross chains 15a and 15b; also a take-up device between cross chains 15c and 15d; also a take-up device between the cross chains 15e and 15f; also a take-up device between cross chains 15g and 15h. The intervening cross chains are all shown at 15i.

This tire chain may be applied to the wheel in the conventional manner of applying tire chains to wheels and the several take-up devices 19 each constitutes a part of the stringer 12 which, as stated above, is to be disposed along the outside or exposed side of the tire. When applying the chain to the tire one of the attaching devices 19 may be used as the one detachably connected to a link in the stringer. With the chain applied, as shown in Fig. 4, wherein the take-up devices are extended, the tire chain as a whole is properly mounted upon the wheel to function as such. The cross chains 15 have sufficient clearance with respect to the tire as to extend completely around the tread thereof and to engage and grip the surface upon which the vehicle is operated. The cross chains are shown in Fig. 4 as being in alignment with their respective cross grooves. But a chain of this character does not remain in a fixed position relative to the tire but has a creeping function. As a result, the cross chains constantly change their position with respect to the tire and, therefore, the cross chains will not remain in alignment with the cross grooves of the tire.

When it is desired to condition the chain so that it is not operative, the take-up devices are adjusted to shortened position, as shown in Figs. 1, 2 and 5. This is done by swinging the member 21 of each latch on its pivot 22, relative to the member 20 and engaging the hook 27 under the member 20, as shown in Fig. 5. Thus the stringer 12 is, in effect, shortened, as shown in Fig. 3 and its effective diameter is decreased. When this is done it is, of course, necessary to align the cross chains with the grooves and then when the stringer 12 is shortened the cross chains are pulled into the groove. This renders the inside stringer 13 taut and the differential in the diameters of the stringers 12 and 13 is indicated in Fig. 3.

By so arranging and spacing the take-up devices, as indicated in Fig. 1, the distance between the ends of the cross chains 15a and 15b is shortened. Therefore, these cross chains are pulled into a relative angular position as indicated. The same thing is true of cross chains 15c and 15d as well as the others which are positioned adjacent the take-up devices. The intervening cross chains 15i are neutral, so to speak, since the lineal extent of the portions of the stringer on opposite sides thereof is not changed.

With the chain adjusted as shown in Fig. 1, the vehicle may be operated over pavement wtih the cross chains held in their grooves and out of contact with the pavement. The grooves 10 are sufficiently deep for this purpose. In any event, should there be some looseness to the chain, the cross chains may contact the pavement as the respective cross chains come into the lower position as the wheel turns but the tire need not pass over the chain. Accordingly, a vehicle may be driven with facility over pavement without undue wear on the chain, which is usually the result of driving on pavement, and without the annoying bumping and vibration which accompanies the operation of a motor vehicle equipped with chains on pavement.

If and when the motorist is confronted with a situation where he must leave the cleared highway, or if it is desired to render the chains operative for any reason, on pavement or off, it is only necessary to release the several take-up devices and the chain is ready to function as such. This can even be done with facility after the vehicle is bogged down or struck in the snow. Of course, when the vehicle is again to be operated over cleared pavement, the chain may again be adjusted to inoperative position. While this requires a manual operation, it is no more difficult than removing the chain. Ofttimes this adjustment of the chain can be made under relatively comfortable conditions as, for example, in a garage or on dry pavement. And when so adjusted, it is ready for immediate use in emergency by merely loosening the tightening devices.

In Fig. 7 there is shown an emergency type of chain, that is, they are sometimes called emergency chains, in that each chain 30 is an independent element. The tire 31 has a suitable tread 32 with a suitable number of cross grooves 33 for receiving individual cross chains. Such a cross chain is usually attached by a strap like device which is passed through an opening 34 in the wheel 35. The strap or fastening device may have a form of buckle 36, as illustrated in Fig. 7 wherein a strap element 37 is secured to one end of a form of buckle, as at 38, and the other strap element 39 passes around another element of the buckle 36 and is frictionally gripped by a lever 41 acted upon by a spring 42. By pulling on the free end 43 of the strap element 39 the chain may be pulled tight to the wheel with the cross chain in the groove. By loosening the buckle the chain may be given sufficient freedom to provide traction. The loosening may be done by swinging the lever 41 against the action of the spring to release its engagement with the strap element 39.

I claim:

Traction means for an automotive vehicle comprising in combination, a tire having a tread for operating upon the surface of a road or other way, said tire having a plurality of grooves positioned crosswise in the tread substantially perpendicular to the mid-circumferential plane of the tire, a tire chain having a stringer for extending along one side of the tire and a stringer for extending along the opposite side of the tire, a plurality of cross chains of substantially the same length interconnecting the stringers and disposed in a manner spaced relative to each other, a plurality of take-up devices in one stringer adjustable to extended position to thereby provide a circumferential extent of said stringer increased relative to the circumferential extent of said tire so that all cross chains freely pass over the tread, said take-up devices being adjustable to shorten said one stringer and draw the ends of the cross chains connected thereto radially inwardly relative to the tire to hold the cross chains in said grooves of the tire, each of said take-up devices being disposed in said stringer between two adjacent cross chains so that corresponding ends of said adjacent cross chains are drawn generally circumferentially toward each other upon shortening said stringer, there being at least one neutral cross chain between each of said two cross chains.

References Cited in the file of this patent

UNITED STATES PATENTS

| | | |
|---|---|---|
| 1,563,960 | Brockhurst | Dec. 1, 1925 |
| 1,680,475 | Power | Aug. 14, 1928 |
| 2,304,318 | Sava | Dec. 8, 1942 |
| 2,332,113 | Reed | Oct. 19, 1943 |
| 2,537,231 | Necrason | Jan. 9, 1951 |
| 2,561,910 | Coffey | July 24, 1951 |